US009960708B2

(12) United States Patent
Fu

(10) Patent No.: US 9,960,708 B2
(45) Date of Patent: May 1, 2018

(54) APPARATUS AND METHOD FOR AN ACTIVE-SWITCHED INVERTER USING MULTIPLE FREQUENCIES

(71) Applicant: Futurewei Technologies, Inc., Plano, TX (US)

(72) Inventor: Dianbo Fu, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 0 days. days.

(21) Appl. No.: 15/136,836

(22) Filed: Apr. 22, 2016

(65) Prior Publication Data
US 2017/0310238 A1  Oct. 26, 2017

(51) Int. Cl.
H02M 7/483 (2007.01)
H02M 7/487 (2007.01)
H02M 7/44 (2006.01)

(52) U.S. Cl.
CPC .............. *H02M 7/487* (2013.01); *H02M 7/44* (2013.01)

(58) Field of Classification Search
CPC ........................................... H02M 7/483–7/49
See application file for complete search history.

(56) References Cited

U.S. PATENT DOCUMENTS 6,388,429 B1 * 5/2002 Mao .......................... G05F 1/70
  323/222
6,480,403 B1 * 11/2002 Bijlenga ................ H02M 7/487
  363/132
2013/0182470 A1 * 7/2013 Chen ...................... H02M 7/537
  363/56.01
2013/0301314 A1  11/2013 Fu et al.
2014/0319919 A1  10/2014 Fu
2015/0083505 A1   3/2015 Pearce, Jr. et al.
2015/0085541 A1   3/2015 Hu et al.

OTHER PUBLICATIONS

E. A. Mahrous, N. A. Rahim and W. P. Hew, "Three-phase three-level voltage source inverter with low switching frequency based on the two-level inverter topology," in IET Electric Power Applications, vol. 1, No. 4, pp. 637-641, Jul. 2007.*
"Flying Capacitor multilevel inverters," Dec. 17, 2013, pp. 1-4, retrieved from http://engineering.electrical-euipment.org/electrical-distribution/flying-capacitor-multilevel-inverters.html.
Choudhury, A. et al., "Reduced Switching Loss Based DC-bus Voltage Balancing Algorithm for Three-Level Neutral point Clamped (NPC) Inverter for Electric Vehicle Applications," IEEE Energy Conversion Congress and Exposition (ECCE), Sep. 2014, pp. 3767-3773.
Ramakrishna Reddy, K. et al., "Five Level Flying-Capacitor Multilevel Converter Using Dynamic Voltage Restorer (DVR)," International Journal of Power System Operation and Energy Management, vol. 1, No. 2, 2011, pp. 59-65.

* cited by examiner

Primary Examiner — Gary L Laxton
Assistant Examiner — Peter Novak
(74) Attorney, Agent, or Firm — Zilka-Kotab, PC

(57) ABSTRACT

An inverter apparatus and method are provided for converting direct current to alternating current. The inverter circuit includes a first switch sub-circuit configured for electrical communication with a power source and switching at a first frequency. The inverter circuit further includes a second switch sub-circuit in electrical communication with the first switch sub-circuit. The second switch sub-circuit is configured for electrical communication with a load and switching at a second frequency different from the first frequency.

17 Claims, 5 Drawing Sheets

APPARATUS AND METHOD FOR AN ACTIVE-SWITCHED INVERTER USING MULTIPLE FREQUENCIES

FIELD OF THE INVENTION

The present invention relates to the field of electronics, and more particularly to inverter circuits.

BACKGROUND

Inverters are circuits for converting a direct current (DC) to an alternating current (AC). That is, an inverter converts direct current electric energy from a source, such as a battery, to an alternating current, which is generally a sine wave or square wave. One particular type of inverter is a multi-level inverter that is configured to first convert a direct current into a step-like square wave of multiple levels, and then form a sine wave by using a filter. If there are more levels implemented by the multi-level inverter, a waveform of a sine wave that is obtained by the multi-level inverter is more approximate to a standard sine waveform. Multi-level inverters are a common power topology for high and medium power applications such as utility interfaces for renewable power sources, flexible alternating current transmission systems, medium voltage motor drive systems, and the like.

In terms of topology varieties, multi-level inverters take many forms, such as diode-clamped multi-level inverters, flying capacitor multi-level inverters, and others (e.g. cascaded H-bridge multi-level inverters, etc.). Unlike flying capacitor multi-level inverters which typically employ capacitors for clamping purposes, diode-clamped multi-level inverters use diodes to provide multiple voltage levels through different phases to capacitor banks. In use, the diode transfers a limited amount of voltage, thereby reducing the stress on other electrical componentry.

Diode-clamped multi-level inverters, however, are limited in a variety of ways. For example, by virtue of the passive nature of the diode(s) themselves, a modulation scheme that controls inverter operation is limited. Further, diode-clamped multi-level inverters are often void of the topology features of other types of topology-specific features (e.g. flying capacitors, etc.) that may afford beneficial attributes in certain topological configurations. Even still, in the event additional levels are desired, diode-clamped multi-level inverter topologies require a significant number of additional components that is directly proportional to the number of desired additional levels. In addition to the augmented cost resulting from such extra required components, there are operational considerations, as well. For instance, the more components incorporated at each inverter level results in larger loop inductances which, in turn, can frustrate switching at high rates (e.g. tens of kHz, etc.).

SUMMARY

An inverter apparatus is provided for converting direct current to alternating current. The inverter circuit includes a first switch sub-circuit configured for electrical communication with a power source and switching at a first frequency. The inverter circuit further includes a second switch sub-circuit in electrical communication with the first switch sub-circuit. The second switch sub-circuit is configured for electrical communication with a load and switching at a second frequency different from the first frequency.

Also provided is an inverter method for converting direct current to alternating current. In operation, a first switch sub-circuit of an inverter circuit is switched at a first frequency. Further, a second switch sub-circuit of the inverter circuit is switched at a second frequency different from the first frequency.

DETAILED DESCRIPTION

Various embodiments are disclosed herein at least some of which address one or more of the challenges with diode-clamped multi-level inverters and/or possibly other inverters, as well. To accomplish this, an inverter circuit is provided with an active first switch sub-circuit that operates at a frequency that is different from a frequency of another active switch sub-circuit of the inverter circuit. By way of such active first switch sub-circuit, a modulation scheme may thereby be provided that is different (e.g. of a lower frequency, etc.) than that which is provided by the second switch sub-circuit of the inverter circuit.

This may, in turn, allow for use of cheaper componentry to support the lower switching requirement of the first switch sub-circuit. In addition, fewer components may be required to implement the second switch sub-circuit, which may afford even additional cost-savings, especially when the inverter circuit is scaled to multiple levels. Still yet, the active first switch sub-circuit may further incorporate other optional components (e.g. a flying capacitor, etc.) to reduce loop inductance which may be beneficial in higher voltage/power/switching-rate applications. More illustrative information will now be set forth regarding various optional topologies and uses by which the foregoing features may or may not be realized, per the desires of the designer, in accordance with different embodiments.

Figure 1:
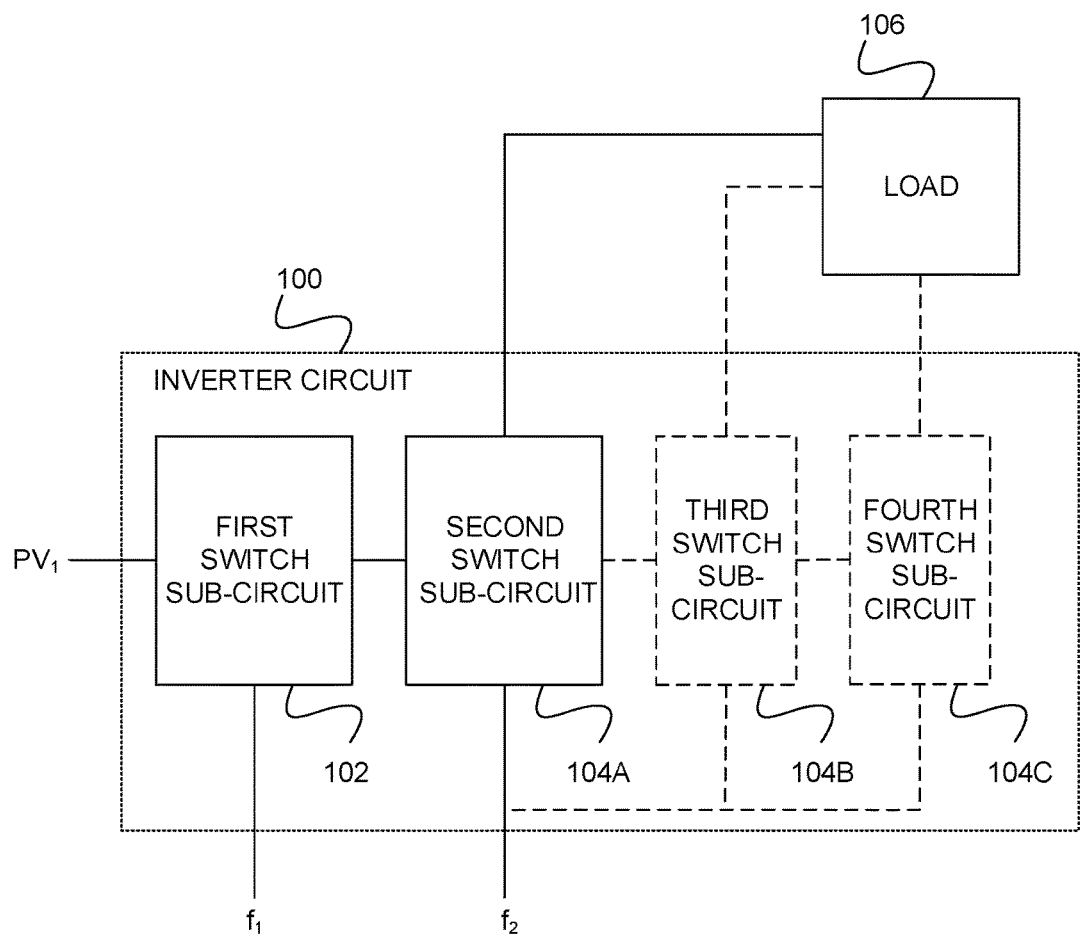
FIG. 1 illustrates an inverter circuit for converting direct current to alternating current, in accordance with one embodiment.

FIG. 1 illustrates an inverter circuit 100 for converting direct current to alternating current, in accordance with one embodiment. As shown, the inverter circuit 100 includes a first switch sub-circuit 102 configured for electrical communication with a power source PV1 which may, in one embodiment, take the form of a direct current battery. In other embodiments, the power source PV1 may take absolutely any desired form including, but not limited to a fuel cell, generator, solar panel, etc. Further, the term "electrical communication" in the context of the present description may refer to any direct and/or indirect electrical coupling between relevant electric components. For instance, such electric components may be in electrical communication with or without intermediate components therebetween.

In operation, the first switch sub-circuit 102 is configured to switch at a first frequency f1. To accomplish this, the first switch sub-circuit 102 may include any desired one or more active components that are capable of switching. For example, in one embodiment, such active component(s) may include one or more transistors of any desired type [e.g. bipolar junction transistors (BJTs), metal oxide semiconductor field effect transistors (MOSFETs), etc.].

With continuing reference to FIG. 1, the inverter circuit 100 further includes one or more additional switch sub-circuits. Specifically, at the very least, the inverter circuit 100 includes a second switch sub-circuit 104A in electrical communication with the first switch sub-circuit 102. The second switch sub-circuit 104A is configured for electrical communication with a load 106. In one embodiment, such load 106 may take the form of a single-phase or multiple-phase motor. In other embodiments, the load 106 may take absolutely any desired form that is capable of consuming alternating current.

In operation, the second switch sub-circuit 104A is configured for switching at a second frequency f2 different from the first frequency f1. In one embodiment, the second frequency f2 may be greater than the first frequency f1. In such embodiment, the difference between the frequencies f1, f2 may be at least a factor of ten. Thus, in some optional embodiments, less-expensive switching components may possibly be used in connection with the first switch sub-circuit 102 by virtue of the lower switching frequency f1, as compared to the second switch sub-circuit 104A which may require more-expensive switching components to accommodate the higher switching frequency f2. Of course, any expense may be expended on any sub-circuit, as desired and for any reason, without departing from the spirit of various embodiments disclosed herein.

In different embodiments, additional switch sub-circuits may be further included, as well. For example, in one possible embodiment, the inverter circuit 100 may further include a third switch sub-circuit 104B in electrical communication with the first switch sub-circuit 102 and the second switch sub-circuit 104A. In operation, the third switch sub-circuit 104B may be configured for electrical communication with a first element (not shown) of the load 106.

Similarly, in another possible embodiment, the inverter circuit 100 may further include a fourth switch sub-circuit 104C in electrical communication with the first switch sub-circuit 102, the second switch sub-circuit 104A, and the third switch sub-circuit 104B. In operation, the fourth switch sub-circuit 104C may be configured for electrical communication with a second element (not shown) of the load 106. To this end, in the aforementioned embodiment where the load 106 includes a motor, the second switch sub-circuit 104A, the third switch sub-circuit 104B, and the fourth switch sub-circuit 104C may be in electrical communication with different elements of the motor.

In either of the foregoing possible embodiments, the additional switch sub-circuits 104B, 104C are configured to switch at the second frequency f2, in the manner shown. In other embodiments, however, it contemplated that the different switch sub-circuits 104A, 104B, 104C may be configured to operate at different respective frequencies, as desired.

Still yet, in one optional embodiment, the switching of the different switch sub-circuits 104A, 104B, 104C may be phase-shifted by different amounts. For example, the third switch sub-circuit 104B may be phase-shifted (with respect to the second switch sub-circuit 104A) a first amount [e.g. one-hundred and twenty (120) degrees, etc.]. Further, the fourth switch sub-circuit 104C may be phase-shifted (with respect to the second switch sub-circuit 104A) a second amount [e.g. two-hundred and forty degrees (240) degrees, etc.].

In one embodiment, the additional switch sub-circuits 104B, 104C may be optionally included without necessarily scaling the number of required additional components in proportion to those of the additional switch sub-circuits 104B, 104C themselves. Specifically, the first switch sub-circuit 102 may, in some embodiments, be reused across the additional switch sub-circuits 104B, 104C (without necessarily replicating the associated components of the first switch sub-circuit 102), for cost savings. Of course, any replication and associated expense may be expended on any sub-circuit, as desired and for any reason, without departing from the spirit of various embodiments disclosed herein.

More illustrative information will now be set forth regarding various optional architectures and uses in which the foregoing method may or may not be implemented, per the desires of the user. For example, in one embodiment, a capacitive sub-circuit (e.g. flying capacitor, etc.) may be placed in electrical communication with the first switch sub-circuit 102 and the second switch sub-circuit 104A. This may, in one embodiment, reduce the loop inductance which may be beneficial in higher voltage/power/switching-rate applications. It should be noted that the following information is set forth for illustrative purposes and should not be construed as limiting in any manner. Any of the following features may be optionally incorporated with or without the exclusion of other features described.

Figure 2:
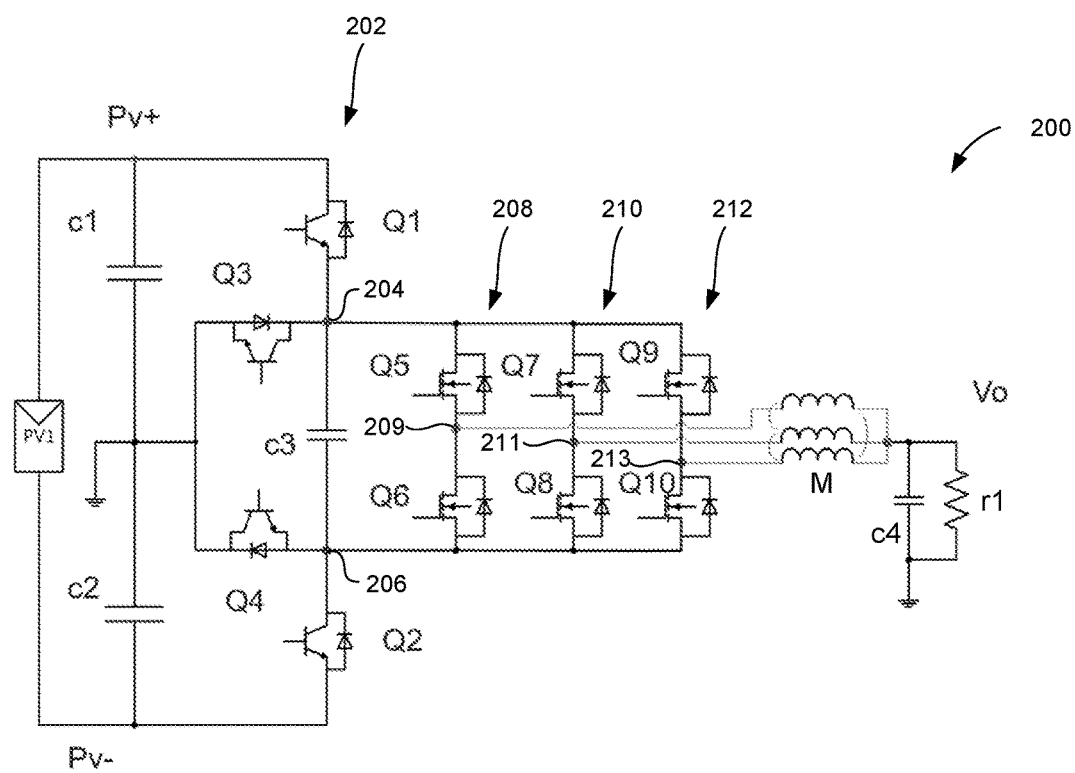
FIG. 2 illustrates a multi-level, multi-channel inverter circuit for converting direct current to alternating current, in accordance with another embodiment.

FIG. 2 illustrates a multi-level, multi-channel inverter circuit 200 for converting direct current to alternating current, in accordance with another embodiment. As an option, the multi-level, multi-channel inverter circuit 200 may be implemented using any feature of any embodiment set forth in any previous and/or subsequent figure(s) and/or the description thereof. With that said, it is to be appreciated that the multi-level, multi-channel inverter circuit 200 may be implemented in any desired manner.

As shown, the multi-level, multi-channel inverter circuit 200 includes a power source PV1 including a positive voltage node Pv+ and a negative voltage node Pv−. The positive voltage node Pv+ of the power source PV1 is electrically coupled to a first capacitor c1 that spans to ground. Further, the negative voltage node Pv1 of the power source PV1 is electrically coupled to a second capacitor c2 that also spans to ground.

As further shown, the multi-level, multi-channel inverter circuit 200 includes a first switch sub-circuit 202 that includes a first transistor Q1 with a collector electrically coupled to the positive voltage node Pv+ of the power source PV1. The first switch sub-circuit 202 further includes a second transistor Q2 with an emitter electrically coupled to the negative voltage node Pv1 of the power source PV1. Also included is a third transistor Q3 with a collector electrically coupled to the emitter of the first transistor Q1 via a first node 204, and an emitter electrically coupled to ground. Further, a fourth transistor Q4 has an emitter electrically coupled to a collector of the second transistor Q2 via a second node 206, and a collector electrically coupled to ground.

In use, the first transistor Q1, the second transistor Q2, the third transistor Q3, and the fourth transistor Q4 may be switched, under control of the base(s) thereof, at a first frequency. Further, such transistors may each include NPN BJT transistor, each equipped with an anti-parallel diode, in the manner shown. In other embodiments, different types of transistors and configurations may be employed, as desired. For example, ion BJT transistors may be employed in another embodiment.

With continuing reference to FIG. 2, the multi-level, multi-channel inverter circuit 200 further includes a third capacitor c3 electrically coupled between the first node 204 and the second node 206. In one embodiment, the third capacitor c3 may take the form of a flying capacitor. In use, the third capacitor c3 serves to reduce loop inductance which may be beneficial in higher voltage/power/switching-rate applications.

Also provided as components of the multi-level, multi-channel inverter circuit 200 is a plurality of additional switch sub-circuits including a second switch sub-circuit 208, a third switch sub-circuit 210, and a fourth switch sub-circuit 212. As shown, the second switch sub-circuit 208 includes a first pair of insulated gate bipolar transistors Q5, Q6 that are serially coupled between the first node 204 and the second node 206, with a third node 209 therebetween for electrical coupling with a first terminal of a motor M. Further, the third switch sub-circuit 210 includes a second pair of insulated gate bipolar transistors Q7, Q8 that are serially coupled between the first node 204 and the second node 206, with a fourth node 211 therebetween for electrical coupling with a second terminal of a motor M. Still yet, the fourth switch sub-circuit 212 includes a third pair of insulated gate bipolar transistors Q9, Q10 that are serially coupled between the first node 204 and the second node 206, with a fifth node 213 therebetween for electrical coupling with a third terminal of a motor M. Such motor M, in turn, includes a fourth terminal that is electrically coupled to ground via a parallel-coupled fourth capacitor c4 and resistor r1, for filtering purposes that will soon become apparent.

In use, the second switch sub-circuit 208, the third switch sub-circuit 210, and the fourth switch sub-circuit 212 may be switched at a second frequency that is greater than the first frequency (at which transistors Q1, Q2, Q3, Q4 operate). As mentioned earlier, in one embodiment, the second frequency may be much higher than the first frequency. Such disparity may or may not even be as high as a magnitude of ten (10), or even more.

To this end, the type, quality, and associated cost of the transistors Q1, Q2, Q3, Q4 may be chosen to capitalize on available cost-savings in view of the lower associated frequency. Further, as shown, the second switch sub-circuit 208, the third switch sub-circuit 210, and the fourth switch sub-circuit 212 may be configured to utilize a minimal number of components (e.g. two transistors/sub-circuits, etc.) to incur further cost-savings, by virtue of the reduced loop inductance afforded by the incorporation of the third capacitor c3. Even still, each of the second switch sub-circuit 208, the third switch sub-circuit 210, and the fourth switch sub-circuit 212 may be electrically coupled to the transistors Q1, Q2, Q3, Q4 and the third capacitor c3 (as shown), in order to interoperate therewith without requiring redundant componentry (e.g. replication of Q1, Q2, Q3, Q4, c3, etc.). Such design may thus even further augment the aforementioned available cost-savings which may or may not be thus incurred, as desired.

Figure 3:
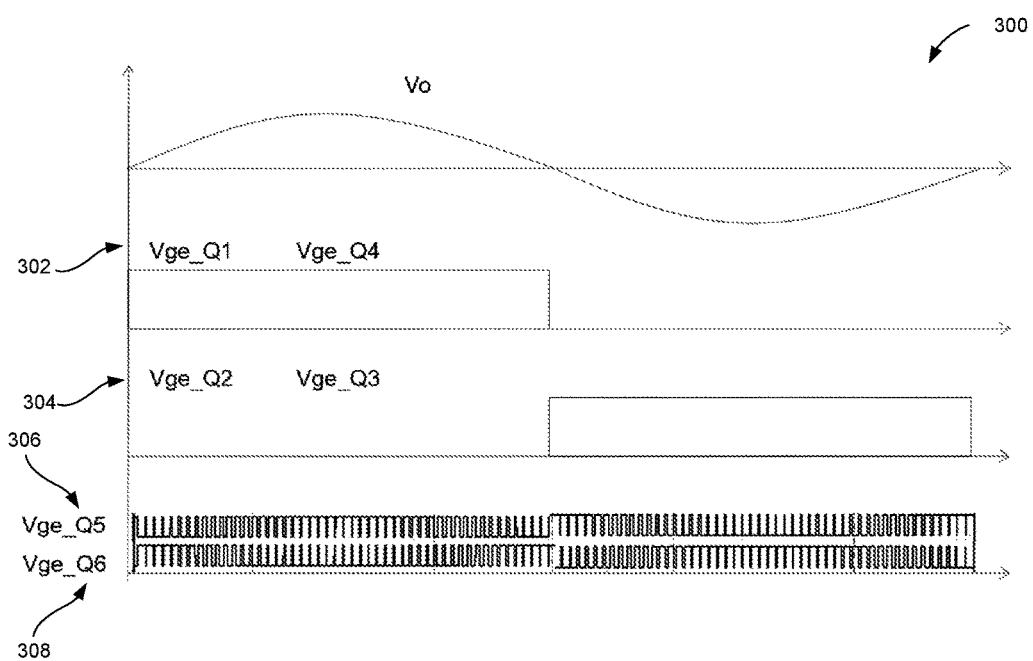
FIG. 3 illustrates a switch operation of a multi-level, multi-channel inverter circuit, in accordance with yet another embodiment.

FIG. 3 illustrates a switch operation 300 of a multi-level, multi-channel inverter circuit, in accordance with yet another embodiment. As an option, the switch operation 300 may reflect operation of any one or more of the embodiments set forth in any previous and/or subsequent figure(s) and/or the description thereof. For example, the switch operation 300 may reflect the multi-level, multi-channel inverter circuit 200 of FIG. 2.

As shown, two complementary outer loop circuit waveforms 302, 304 reflect operation of an outer loop circuit (e.g. first switch sub-circuit 202 of FIG. 2, etc.). Such complementary waveforms 302, 304 are shown to switch at a first frequency. Specifically, the waveform 302 reflects voltage levels Vge_Q1, Vge_Q4 of transistors of the outer loop circuit (e.g. transistors Q1, Q4 of FIG. 2, etc.), while the waveform 304 reflects voltage levels Vge_Q2, Vge_Q3 of other transistors of the outer loop circuit (e.g. transistors Q2, Q3 of FIG. 2, etc.).

Also shown are two inner loop circuit complementary waveforms 306, 308 that reflect operation of a portion of an inner loop circuit (e.g. second switch sub-circuit 208 of FIG. 2, etc.). Such complementary waveforms 306, 308 are shown to switch at a second frequency that is much greater than the first frequency. Further, the waveform 306 reflects a voltage level Vge_Q5 of a transistor of the inner loop circuit (e.g. transistor Q5 of FIG. 2, etc.), while the waveform 308 reflects a voltage level Vge_Q6 of an additional transistor of the inner loop circuit (e.g. transistor Q6 of FIG. 2, etc.).

To this end, a filtered output voltage Vo is provided, as shown. While the switch operation 300 is shown to exhibit a continuous current mode, it is contemplated that at least one switch sub-circuit of the inverter circuit may be configured to operate in a discontinuous current mode. In the context of the present description, such discontinuous current mode may entail any voltage fluctuation that remains at a null state (e.g. zero or near-zero voltage, etc.) more regularly than that which is exhibited by a typical sinusoidal waveform.

Figure 4:
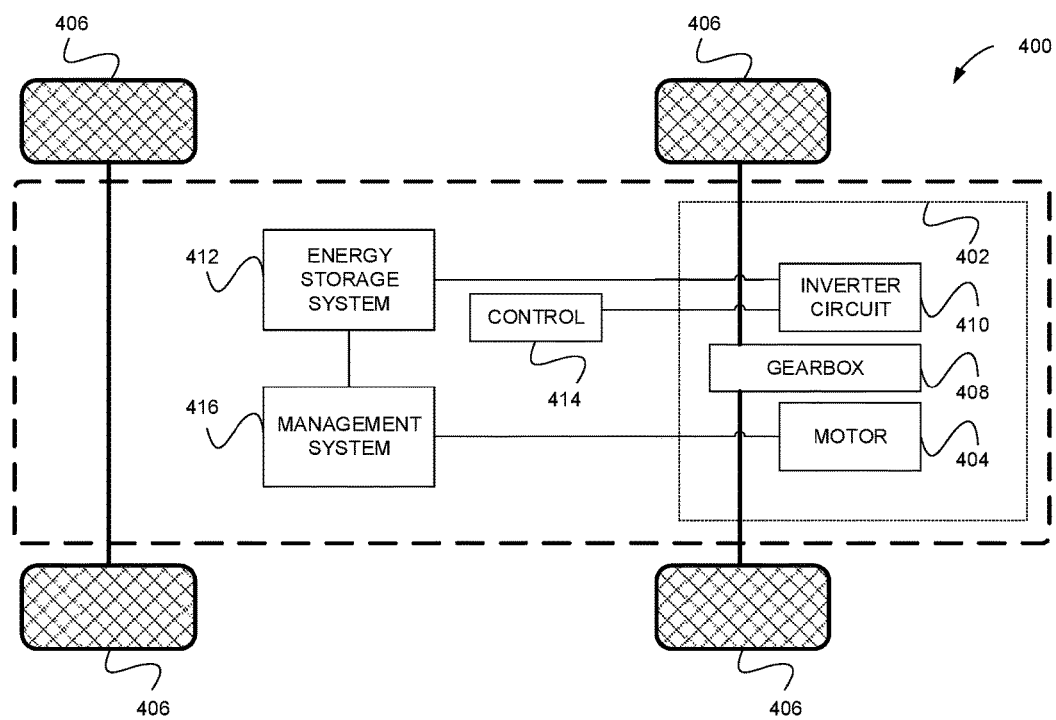
FIG. 4 illustrates a vehicle, in accordance with one embodiment.

FIG. 4 illustrates a vehicle 400, in accordance with one embodiment. In one optional embodiment, the vehicle 400 may be implemented utilizing one or more of the inverter circuits 100, 200 of FIGS. 1 and 2. However, it should be strongly noted that the current application of the inverter circuits 100, 200 of FIGS. 1 and 2 is set forth for illustrative purposes only and should not be construed as limiting in any manner.

In one embodiment, the vehicle 400 may include an electric vehicle. In other embodiments, the vehicle 400 may include a hybrid vehicle. Even still, other machines (e.g. trains, boats, airplanes, etc.) are contemplated, as well.

As shown, the vehicle 400 includes a drive system 402 with a motor 404 that drives a plurality of wheels 406 via a gearbox 408. The drive system 402 is further equipped with an inverter circuit 410 that converts direct current provided by an energy storage system 412 into alternating current usable by the motor 404, under the control of control circuitry 414. In various embodiments, the inverter circuit 410 may include one or more inverter circuit features described hereinabove. While the inverter circuit 410 is shown to be part of the drive system 402 and the control circuitry 414 is shown to be external to the drive system 402, it should be noted that such components (and any other components, for that matter) may be situated in any desired place and/or fashion (e.g. integrated or not, etc.).

Further, the control circuitry 414 may include passive power devices (e.g. transient filtering capacitors and/or inductors), active power devices (e.g. semiconductor and/or electromechanical switching devices, circuit protection devices, etc.), sensing devices (e.g. voltage, current, and/or power flow sensors, etc.), logic control devices, communication devices, converters for converting the energy supplied by the inverter circuit 410 to a suitable level for various vehicle systems (e.g. auxiliary systems, HVAC system, entertainment system, lighting, etc.), charging circuits, etc.

Still yet, a management system 416 is shown to be provided and in communication with various components of the drive system 402. In use, the management system 416 may include various heating, cooling, and/or monitoring subsystems that, in turn, may be used to optimize battery performance and/or safety.

Figure 5:
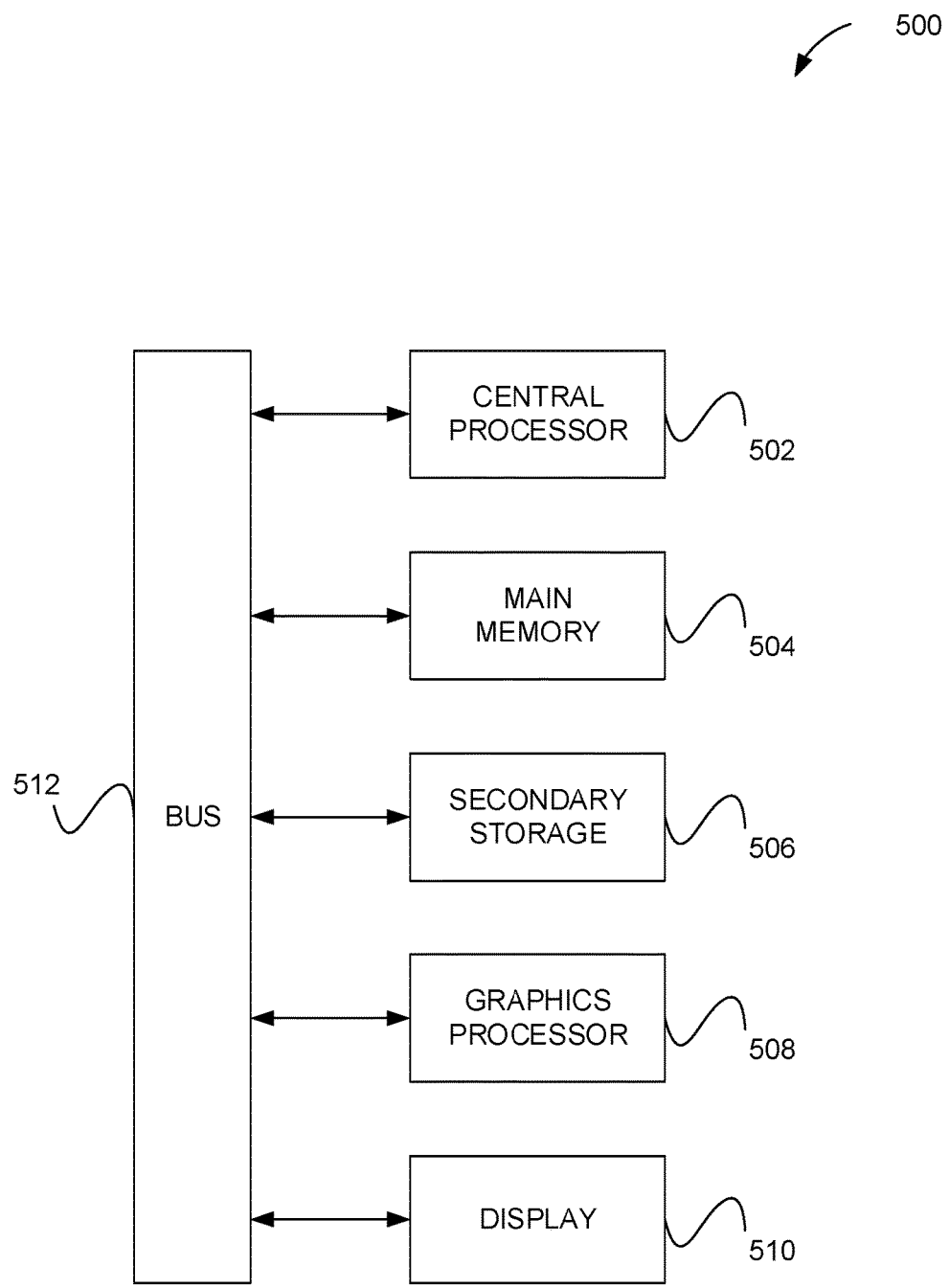
FIG. 5 illustrates an exemplary computer system, in accordance with one embodiment.

FIG. 5 illustrates an exemplary computer system 500, in accordance with one embodiment. As an option, the computer system 500 or any of the components thereof may be implemented utilizing one or more of the inverter circuits 100, 200 of FIGS. 1 and 2. However, it should be strongly noted that the current application of the inverter circuits 100, 200 of FIGS. 1 and 2 is set forth for illustrative purposes only and should not be construed as limiting in any manner.

As shown, the computer system 500 is provided including at least one central processor 501 which is connected to a bus 512. The computer system 500 also includes main memory 504 [e.g. hard disk drive, solid state drive, random access memory (RAM), etc.]. The computer system 500 also includes a graphics processor 508 and a display 510.

The system 500 may also include a secondary storage 506. The secondary storage 506 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 506, and/or any other memory, for that matter. Such computer programs, when executed, enable the computer system 500 to perform various functions (as set forth above, for example). Memory 504, secondary storage 506 and/or any other storage are examples of n computer-readable media.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g. a processor-based or processor-containing machine) and/or as specialized circuits or circuitry (e.g. discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g. "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. An apparatus, comprising:
   an inverter circuit for converting a direct current to an alternating current, the inverter circuit including:
   a first switch sub-circuit configured for electrical communication with a power source and switching at a first frequency; and
   a second switch sub-circuit in electrical communication with the first switch sub-circuit, and configured for electrical communication with a load and switching at a second frequency different from the first frequency, wherein the second frequency is greater than the first frequency by at least a factor of ten;
   wherein the first switch sub-circuit includes a first transistor with a collector configured for electrical communication with the power source; a second transistor with an emitter configured for electrical communication with the power source; a third transistor with a collector in electrical communication with an emitter of the first transistor via a first node, and an emitter in electrical communication with ground; and a fourth transistor with an emitter in electrical communication with a collector of the second transistor via a second node, and a collector configured for electrical communication with ground.

2. The apparatus of claim 1, and further comprising a third switch sub-circuit in electrical communication with the first switch sub-circuit and the second switch sub-circuit, the third switch sub-circuit configured for electrical communication with a first element of the load and switching at the second frequency.

3. The apparatus of claim 2, wherein the third switch sub-circuit is configured such that the switching thereof is phase-shifted a first amount with respect to the switching of the second switch sub-circuit.

4. The apparatus of claim 3, wherein the third switch sub-circuit is configured such that the first amount is one-hundred and twenty degrees.

5. The apparatus of claim 2, and further comprising a fourth switch sub-circuit in electrical communication with the first switch sub-circuit, the second switch sub-circuit, and the third switch sub-circuit, the fourth switch sub-circuit configured for electrical communication with a second element of the load and switching at the second frequency.

6. The apparatus of claim 5, wherein the fourth switch sub-circuit is configured such that the switching thereof is phase-shifted a second amount with respect to the switching of the second switch sub-circuit.

7. The apparatus of claim 6, wherein the third switch sub-circuit is configured such that the second amount is two-hundred and forty degrees.

8. The apparatus of claim 5, wherein the inverter circuit is configured such that the load includes a motor; and the second switch sub-circuit, the third switch sub-circuit, and the fourth switch sub-circuit are in electrical communication with different elements of the motor.

9. The apparatus of claim 1, and further comprising a capacitive sub-circuit in electrical communication with the first switch sub-circuit and the second switch sub-circuit.

10. The apparatus of claim 9, wherein the capacitive sub-circuit includes a flying capacitor.

11. The apparatus of claim 1, wherein the first switch sub-circuit includes a pair of bipolar junction transistors (BJTs).

12. The apparatus of claim 1, wherein the second switch sub-circuit includes a pair of metal oxide semiconductor field effect transistors (MOSFETs).

13. The apparatus of claim 1, and further comprising a capacitor in electrical communication between the first node and the second node.

14. The apparatus of claim 13, wherein the second switch sub-circuit includes a pair of serially-coupled transistors between the first node and the second node.

15. The apparatus of claim 14, wherein the pair of serially-coupled transistors include insulated gate bipolar transistors.

16. The apparatus of claim 1, wherein the second switch sub-circuit is configured to operate in a discontinuous current mode.

17. A method, comprising:
    switching a first switch sub-circuit of an inverter circuit at a first frequency; and
    switching a second switch sub-circuit of the inverter circuit at a second frequency different from the first frequency, wherein the second frequency is greater than the first frequency by at least a factor of ten;
    wherein the first switch sub-circuit includes a first transistor with a collector configured for electrical communication with a power source; a second transistor with an emitter configured for electrical communication with the power source; a third transistor with a collector in electrical communication with an emitter of the first transistor via a first node, and an emitter in electrical communication with ground; and a fourth transistor with an emitter in electrical communication with a collector of the second transistor via a second node, and a collector configured for electrical communication with ground.

* * * * *